(12) United States Patent
Shroff et al.

(10) Patent No.: US 11,359,745 B2
(45) Date of Patent: Jun. 14, 2022

(54) FUEL MONITORING SYSTEM

(71) Applicant: The Heil Co., Chattanooga, TN (US)

(72) Inventors: Nitesh Shroff, Chattanooga, TN (US); Brian H. Ham, Huntsville, AL (US); Stanley Maroney, Attalla, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/163,828

(22) Filed: Feb. 1, 2021

(65) Prior Publication Data

US 2021/0364101 A1 Nov. 25, 2021

Related U.S. Application Data

(63) Continuation of application No. 15/865,324, filed on Jan. 9, 2018, now Pat. No. 10,914,401.

(60) Provisional application No. 62/444,438, filed on Jan. 10, 2017.

(51) Int. Cl.
*G01M 3/18* (2006.01)
*G01M 3/32* (2006.01)
*F16K 37/00* (2006.01)
*G06F 3/048* (2013.01)

(52) U.S. Cl.
CPC ......... *F16K 37/0091* (2013.01); *G01M 3/184* (2013.01); *G01M 3/3236* (2013.01); *G06F 3/048* (2013.01)

(58) Field of Classification Search
CPC ...... G01M 3/3236; G01M 3/184; G01R 31/06
See application file for complete search history.

(56) References Cited

U.S. PATENT DOCUMENTS

| 2,574,177 | A | 11/1951 | Godet |
| 2,895,560 | A | 7/1959 | Lynn |
| 3,134,603 | A | 5/1964 | Rogers |
| 3,565,201 | A | 2/1971 | Petsinger |
| 5,330,031 | A | 7/1994 | Hill et al. |
| 5,527,098 | A | 6/1996 | McKinney et al. |
| 5,549,096 | A | 8/1996 | Swenson et al. |
| 5,554,976 | A | 9/1996 | Miyauchi et al. |
| 5,558,246 | A | 9/1996 | Ross, Jr. |
| 5,611,316 | A | 3/1997 | Oshima et al. |
| 5,658,117 | A | 8/1997 | McKinney et al. |
| 5,787,920 | A | 8/1998 | Krasnov |

(Continued)

FOREIGN PATENT DOCUMENTS

| CN | 107388030 | 11/2017 |
| JP | 2008137643 | 6/2008 |

OTHER PUBLICATIONS

[No Author], "Momentum CNG Fuel System," available no later than Sep. 21, 2018, 1 page.

(Continued)

*Primary Examiner* — Jennifer Bahls
(74) *Attorney, Agent, or Firm* — Fish & Richardson P.C.

(57) ABSTRACT

A CNG leak detection system has a plurality of CNG tanks. A plurality of control valve mechanisms, equal in number to the plurality of CNG tanks, is coupled with each CNG tank. A sensor is coupled with each control valve mechanism. The sensor monitors the CNG in the tank. A processor is electrically coupled with the sensor. A display is coupled with the processor to display the sensed condition of at least one desired tank of the plurality of tanks.

24 Claims, 15 Drawing Sheets

(56) References Cited

U.S. PATENT DOCUMENTS

| | | | |
|---|---|---|---|
| 5,829,418 A | 11/1998 | Tamura et al. | |
| 6,041,762 A | 3/2000 | Sirosh et al. | |
| 6,095,367 A | 8/2000 | Blair et al. | |
| 6,112,760 A | 9/2000 | Scott et al. | |
| 6,213,243 B1 | 4/2001 | Studebaker et al. | |
| 6,257,360 B1 | 7/2001 | Wozniak et al. | |
| 6,268,803 B1 | 7/2001 | Gunderson et al. | |
| 6,279,612 B1 | 8/2001 | Warth | |
| 6,291,770 B1 | 9/2001 | Casperson | |
| 6,367,573 B1 | 4/2002 | Scott | |
| 6,390,075 B1 | 5/2002 | Yamazaki et al. | |
| 6,401,698 B1 | 6/2002 | Yamazaki et al. | |
| 6,412,588 B1 | 7/2002 | Scott et al. | |
| 6,418,962 B1 | 7/2002 | Wozniak et al. | |
| 6,439,334 B1 | 8/2002 | Myers et al. | |
| 6,467,466 B1 | 10/2002 | Maekawa et al. | |
| 6,481,751 B1 | 11/2002 | Davis, Jr. et al. | |
| 6,502,660 B1 | 1/2003 | Scott et al. | |
| 6,527,075 B1 | 3/2003 | Izuchukwu et al. | |
| 6,532,684 B1 | 3/2003 | Tunnev et al. | |
| 6,595,569 B1 | 7/2003 | McKinney | |
| 6,957,171 B2 | 10/2005 | White et al. | |
| 7,137,474 B2 | 11/2006 | Yokote | |
| 7,159,738 B2 | 1/2007 | Luongo | |
| 7,270,209 B2 | 9/2007 | Suess | |
| 7,322,345 B2 | 1/2008 | Saito et al. | |
| 7,426,935 B2 | 9/2008 | Schwan et al. | |
| 7,543,667 B2 | 6/2009 | Hwang et al. | |
| 7,624,753 B2 | 12/2009 | Suess et al. | |
| 7,648,787 B2 | 1/2010 | Suematsu et al. | |
| RE41,142 E | 2/2010 | Blair et al. | |
| 7,882,587 B2 | 2/2011 | Tagliaferri | |
| 7,976,067 B2 | 7/2011 | Naganuma | |
| 8,020,430 B2 | 9/2011 | Farnsworth | |
| 8,443,820 B2 | 5/2013 | Ulrey et al. | |
| 8,539,972 B2 | 9/2013 | Xu | |
| 8,690,191 B2 | 4/2014 | Gentry | |
| 9,064,401 B2 | 6/2015 | Grant et al. | |
| 9,252,440 B2 | 2/2016 | Yoshida et al. | |
| 9,284,895 B2 | 3/2016 | Naidu et al. | |
| 9,454,856 B2 | 9/2016 | Ahmad et al. | |
| 9,533,569 B2 | 1/2017 | McKinney | |
| 9,579,969 B2 | 2/2017 | Crist et al. | |
| 9,592,731 B2 | 3/2017 | Hanlin et al. | |
| 9,694,671 B2 | 7/2017 | Wildarube et al. | |
| 9,850,845 B2 | 12/2017 | Sloan et al. | |
| 9,981,551 B2 | 5/2018 | McKinney | |
| 10,914,401 B2 | 2/2021 | Shroff et al. | |
| 2001/0032628 A1 | 10/2001 | Goto et al. | |
| 2001/0032747 A1 | 10/2001 | DePoy et al. | |
| 2002/0096212 A1 | 7/2002 | Yamada et al. | |
| 2002/0134342 A1* | 9/2002 | Agricola | F02D 19/025 123/198 D |
| 2004/0091345 A1 | 5/2004 | Flerchinger et al. | |
| 2007/0023215 A1 | 2/2007 | Ueda | |
| 2008/0098562 A1 | 5/2008 | Tagliaferri | |
| 2008/0156809 A1 | 7/2008 | Mizuno et al. | |
| 2010/0047047 A1 | 2/2010 | Mayer et al. | |
| 2010/0078244 A1 | 4/2010 | Pursifull | |
| 2010/0252353 A1 | 10/2010 | Tsubokawa | |
| 2011/0288738 A1 | 11/2011 | Donnelly | |
| 2012/0115061 A1 | 5/2012 | Tsubokawa | |
| 2012/0228307 A1 | 9/2012 | Simmons | |
| 2012/0280481 A1 | 11/2012 | Gentry | |
| 2013/0092436 A1 | 4/2013 | Silc et al. | |
| 2013/0092694 A1 | 4/2013 | Green | |
| 2013/0104997 A1 | 5/2013 | Harper | |
| 2013/0199499 A1 | 8/2013 | Pursifull | |
| 2013/0199863 A1 | 8/2013 | Robbins | |
| 2013/0238226 A1 | 9/2013 | Slaynnaker et al. | |
| 2014/0061266 A1 | 3/2014 | Milton | |
| 2014/0069972 A1 | 3/2014 | Willemsen | |
| 2014/0109974 A1 | 4/2014 | Zoz | |
| 2014/0111327 A1* | 4/2014 | Naidu | F02D 19/021 73/40.5 R |
| 2014/0217107 A1 | 8/2014 | Sloan et al. | |
| 2014/0367954 A1 | 12/2014 | McKinney | |
| 2014/0373531 A1 | 12/2014 | Wong | |
| 2015/0112506 A1 | 4/2015 | Hanlin | |
| 2015/0129338 A1 | 5/2015 | Green | |
| 2016/0023548 A1* | 1/2016 | Crist | B60K 15/03006 180/271 |
| 2016/0177857 A1 | 6/2016 | Sarikaya et al. | |
| 2016/0257196 A1 | 9/2016 | Green | |
| 2016/0273472 A1 | 9/2016 | Ariie et al. | |
| 2017/0106746 A1 | 4/2017 | McKinney | |
| 2017/0158050 A1 | 6/2017 | Crist et al. | |
| 2017/0282710 A1 | 10/2017 | Sloan et al. | |
| 2017/0297425 A1 | 10/2017 | Wildqrube et al. | |
| 2018/0065476 A1 | 3/2018 | McKinney | |
| 2018/0111477 A1 | 4/2018 | Sloan et al. | |
| 2018/0195638 A1 | 7/2018 | Shroff et al. | |
| 2019/0023127 A1 | 1/2019 | McKinney | |
| 2020/0094673 A1 | 3/2020 | Shroff et al. | |

OTHER PUBLICATIONS

Pehrson et al., "NFPA 52: Vehicular Natural Gas Fuel Systems Code," 2016 ed., Apr. 2016, 78 pages.

Undated photographs taken by Fab Industries (now Agility) of a Labrie Refuse Vehicle with an Auxiliary CNG Holder added to the tailgate (12 pages).

* cited by examiner

FUEL MONITORING SYSTEM

CROSS-REFERENCE TO RELATED APPLICATIONS

This application is a continuation of U.S. application Ser. No. 15/865,324, filed on Jan. 9, 2018, which claims the benefit of U.S. Provisional Application No. 62/444,438, filed on Jan. 10, 2017. The entire disclosure of the above applications are incorporated herein by reference.

FIELD

The present disclosure relates to fuel monitoring and, more particularly, to an automatic solenoid failure and leak detection system for a compressed natural gas (CNG) tank system for a refuse vehicle.

BACKGROUND

Various types of compressed natural gas (CNG) powered vehicles exist. These vehicles have a plurality of CNG tanks that provide fuel to the engine. Some of these vehicles utilize detection systems that detect solenoid failure in the system. Thus, solenoid failure detection is sensed across the entire system. The solenoid failure detection systems have a large pressure differential to determine if solenoid failure has occurred. Additionally, due to the large pressure difference, it takes a significant amount of time to detect a solenoid failure. Further, the indicators for the failure detection are small and mounted outside of the vehicle. They fail to illustrate which solenoid has failed. Also, there is light in the cab indicating that a failure has occurred, however, the driver must exit the vehicle to examine the detection module at the rear of the vehicle.

SUMMARY

It is desirable to provide a detection system that overcomes the deficiencies of the existing art. The present detection system is provided on CNG tanks of a refuse vehicle. The present system detects solenoid failure on each individual tank. The present system also detects leaks in the individual tanks. Additionally, it detects leaks in the system when the ignition is initially off and a leak occurs in the fueling system. The present detection system provides both an audio and visual warning in the vehicle cab. The present detection system provides live pressure monitoring of individual tanks. The present detection system also provides live pressure monitoring of the system when the ignition is turned on. The present detection system provides the user with an interface that displays individual signals. Thus, the user may easily detect solenoid failure and leakage at individual tanks and lines.

According to a first aspect of the disclosure, a CNG automatic solenoid failure and leak detection system comprises a plurality of CNG tanks. A plurality of control valves, equal in number to the plurality of CNG tanks, is coupled with each of the CNG tanks. A sensor is coupled with each control valve. The sensors monitor the CNG in the tank. A processor is electrically coupled with the sensors, usually pressure sensors. A display is coupled with the processor. The display provides an indicator of the sensed condition of at least one desired tank of the plurality of tanks. The display displays the sensed condition of the plurality of tanks. The display provides a reading of the pressure in the desired tank. The display provides a reading of the pressure in the system. Also, the display will illustrate a failure or leak signal. Additionally, an audio alarm is coupled with the processor to provide an audio signal.

According to a second aspect of the disclosure, a refuse vehicle comprises a vehicle chassis with a container secured with the vehicle chassis. A plurality of CNG tanks are on the vehicle chassis. A plurality of control valves, equal in number to the plurality of CNG tanks, is coupled with each of the CNG tanks. A sensor is coupled with each control valve. The sensors monitor the CNG in the tank. A processor is electrically coupled with the sensors, usually pressure sensors. A display is coupled with the processor. The display provides an indicator of the sensed condition of at least one desired tank of the plurality of tanks. The display displays the sensed condition of the plurality of tanks. The display provides a reading of the pressure in the desired tank. The display provides a reading of the pressure in the system. Also, the display will illustrate a failure or leak signal. Additionally, an audio alarm is coupled with the processor to provide an audio signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
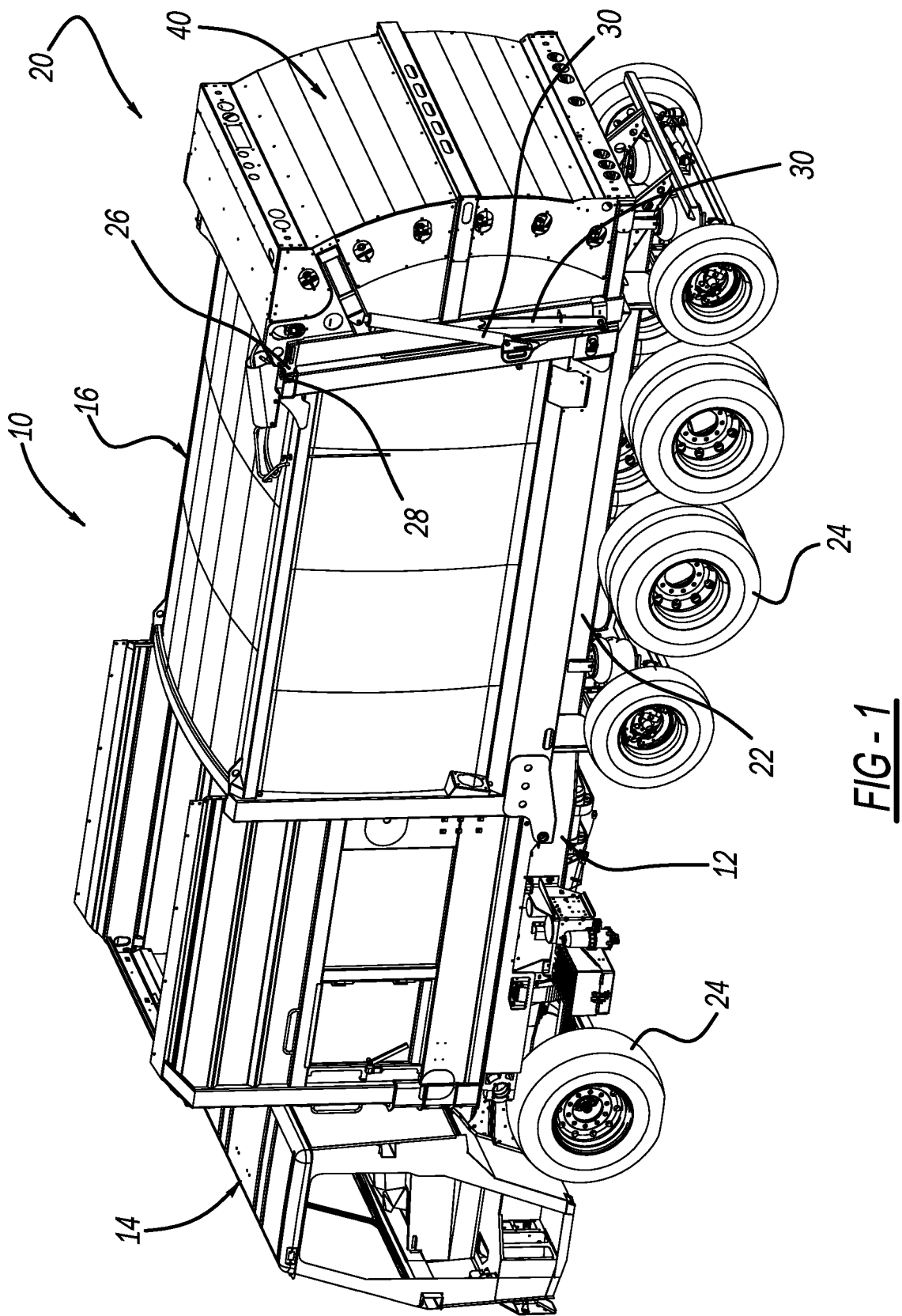
FIG. 1 is a perspective view of a refuse vehicle with CNG tanks.

Example embodiments will now be described more fully with reference to the accompanying drawings.

Turning to the figures, a refuse vehicle is illustrated and designated with the reference numeral 10. The refuse vehicle includes a chassis 12 with a cab 14, a refuse container 16 and tailgate 20. The chassis 12 includes a frame 22 that receives the refuse container 16 as well as wheels 24 connected with a drive train that provides mobility of the vehicle.

Figure 2:
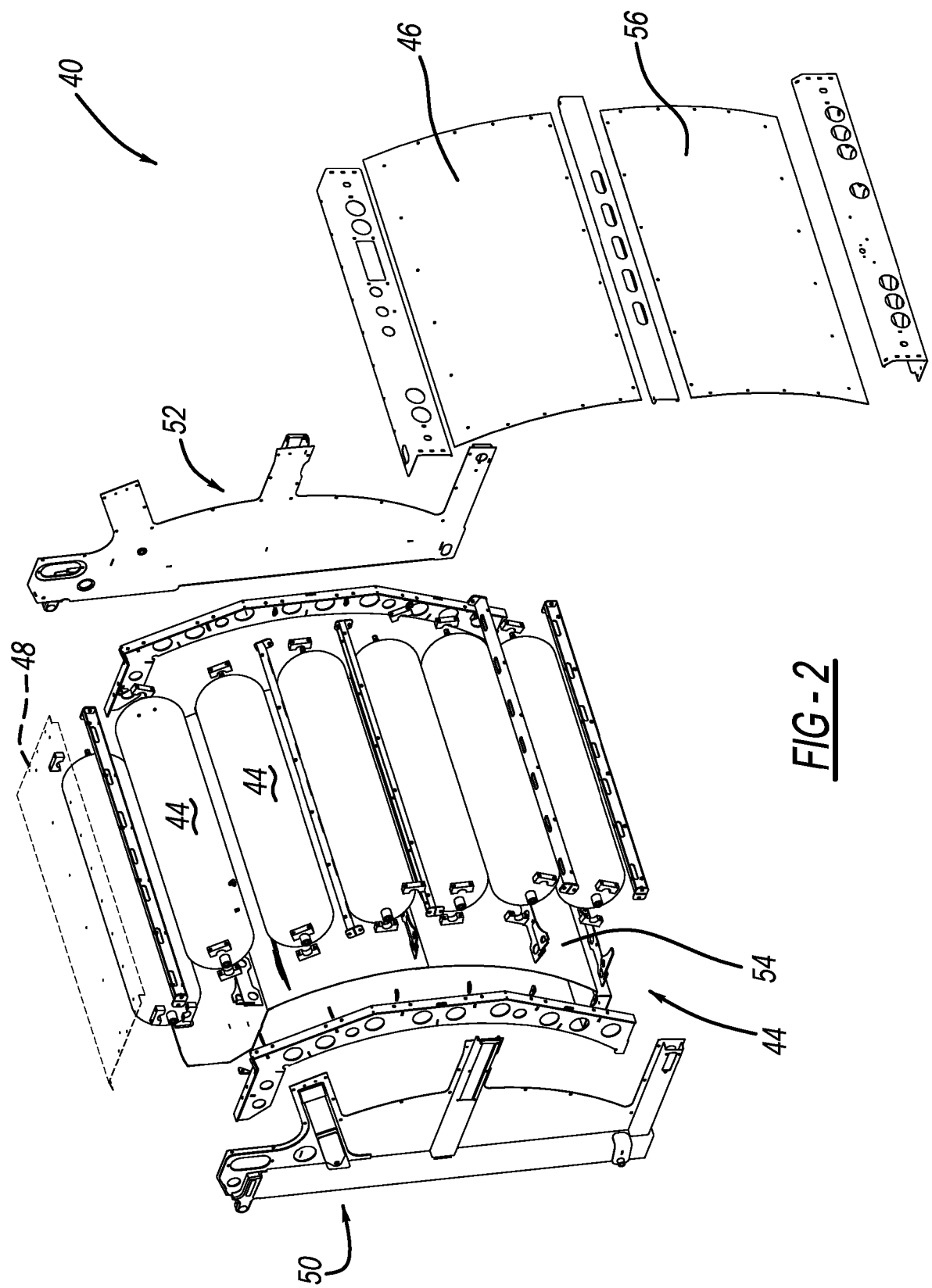
FIG. 2 is an exploded view of a tailgate including the tanks.
Figure 3:
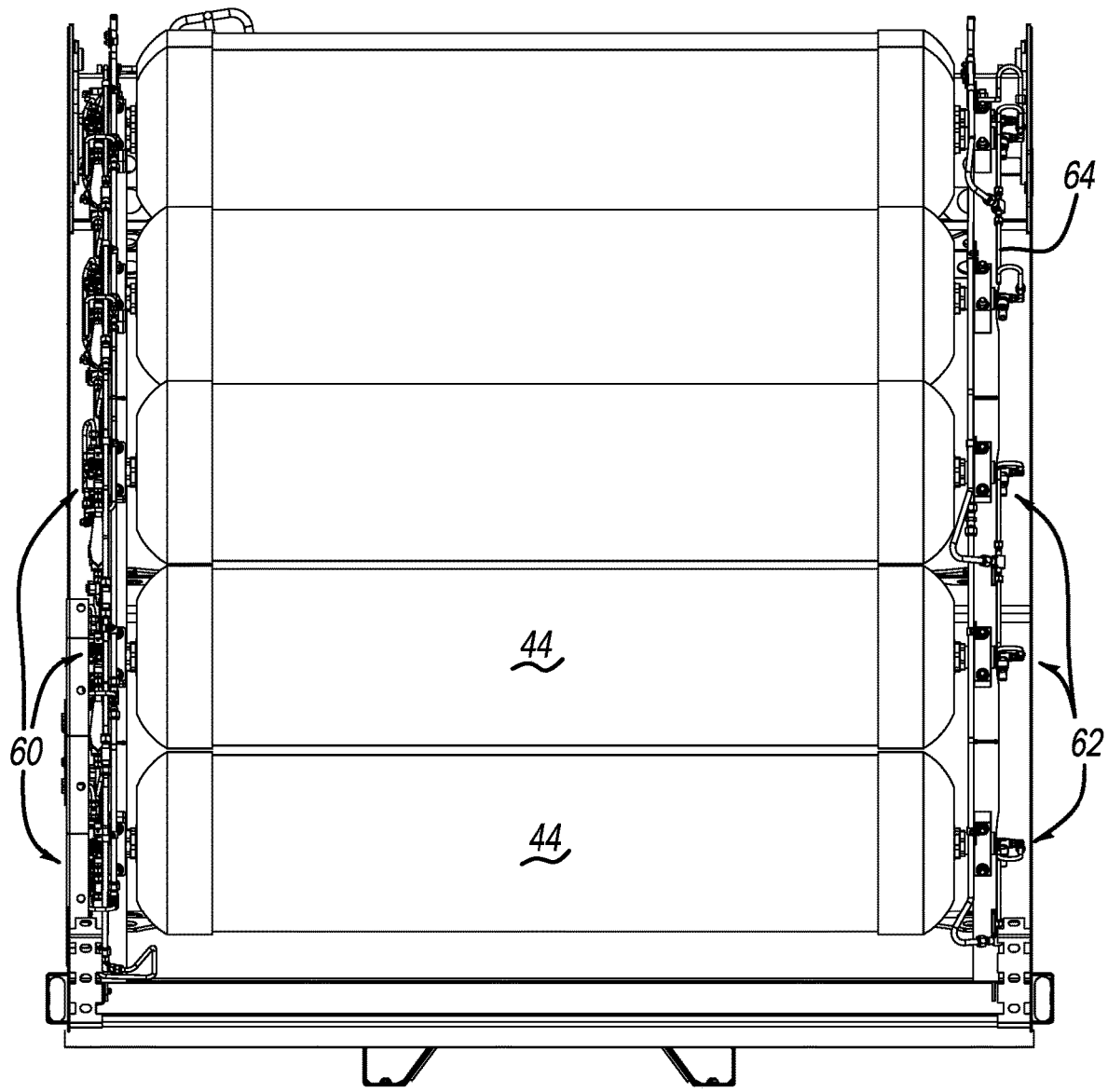
FIG. 3 is an elevation view of the tanks in the tailgate.
Figure 4:
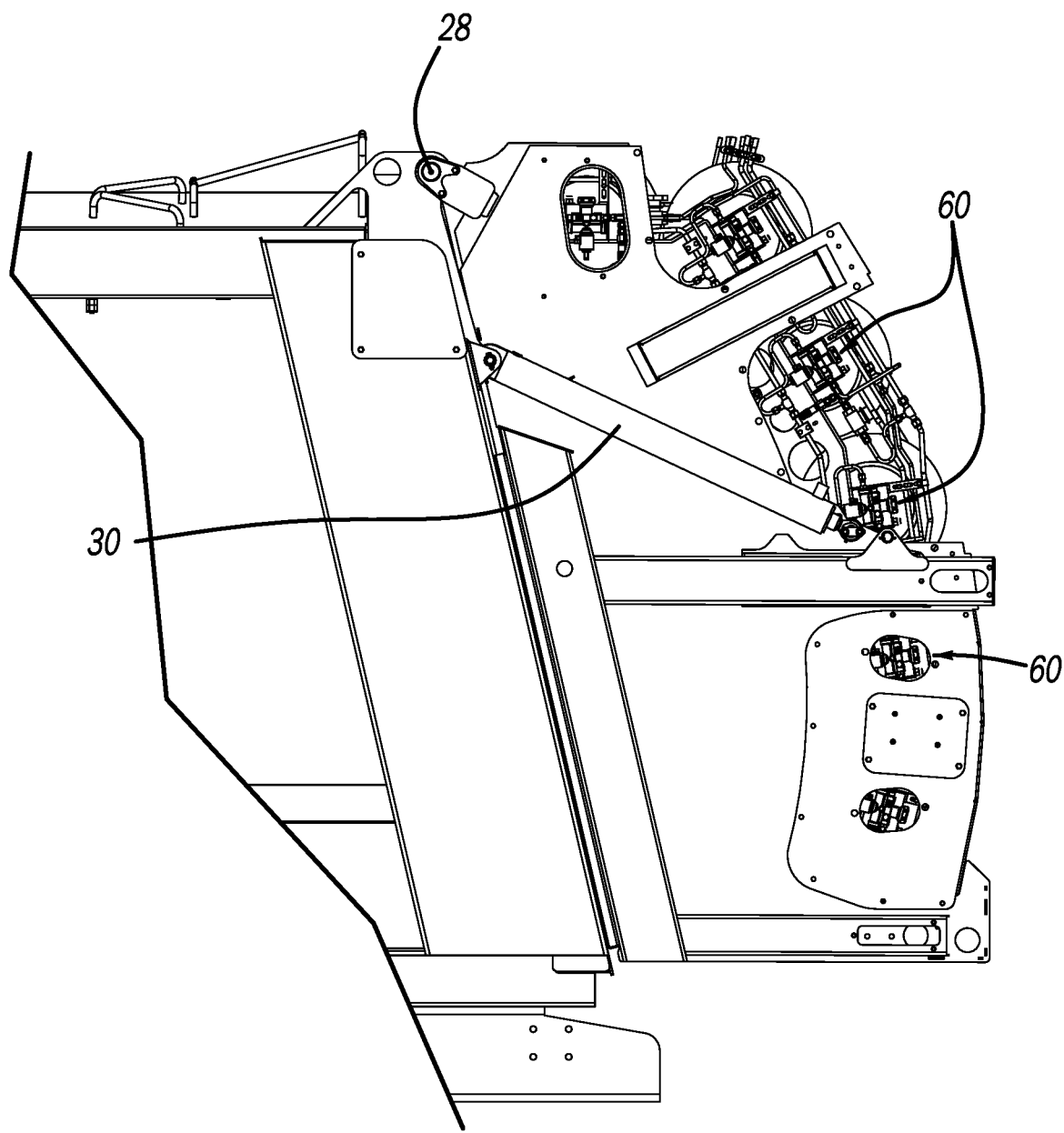
FIG. 4 is a left side elevation view of the tanks on the tailgate.
Figure 5:
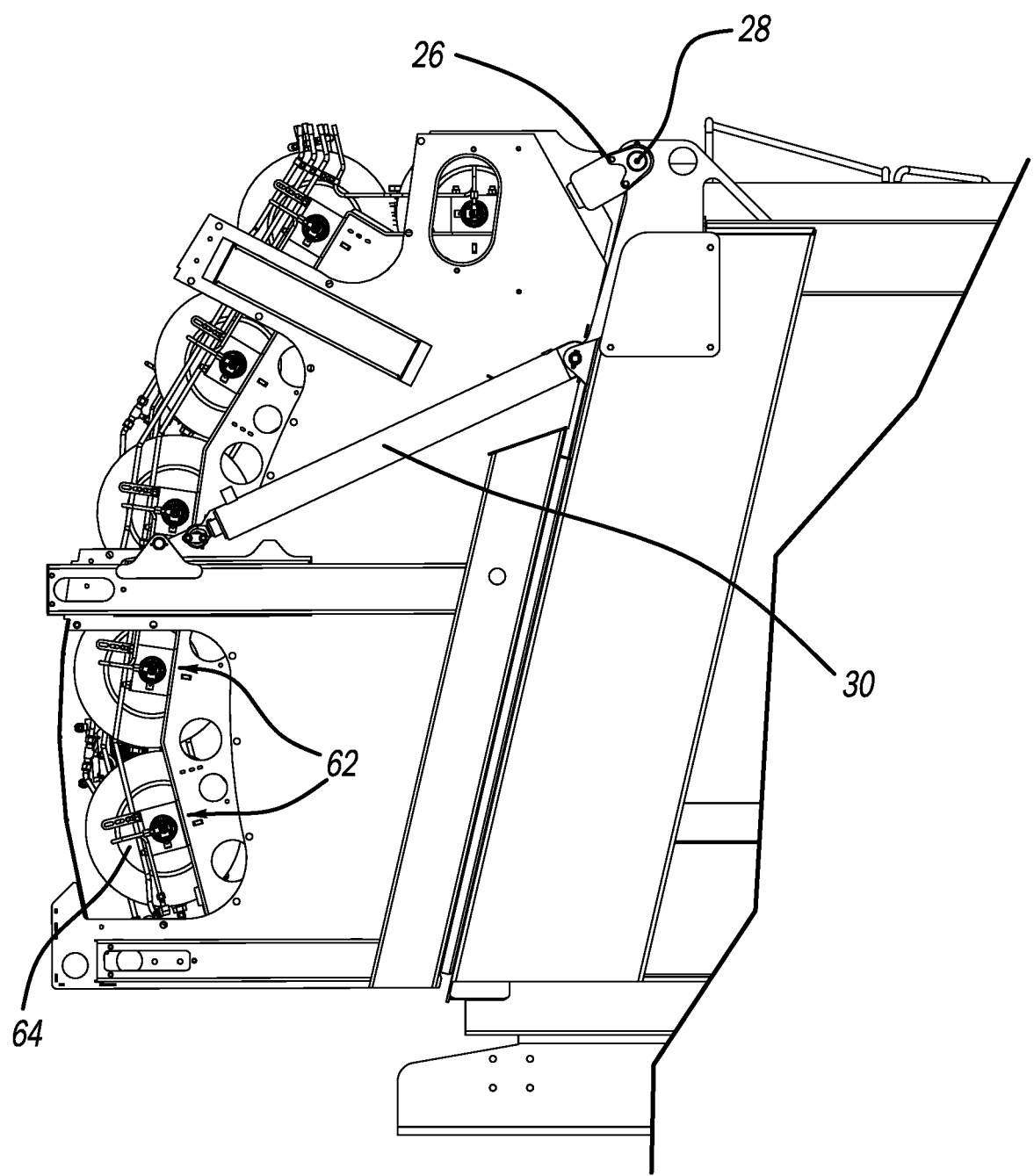
FIG. 5 is a right side view of the tanks on the tailgate.
Figure 6:
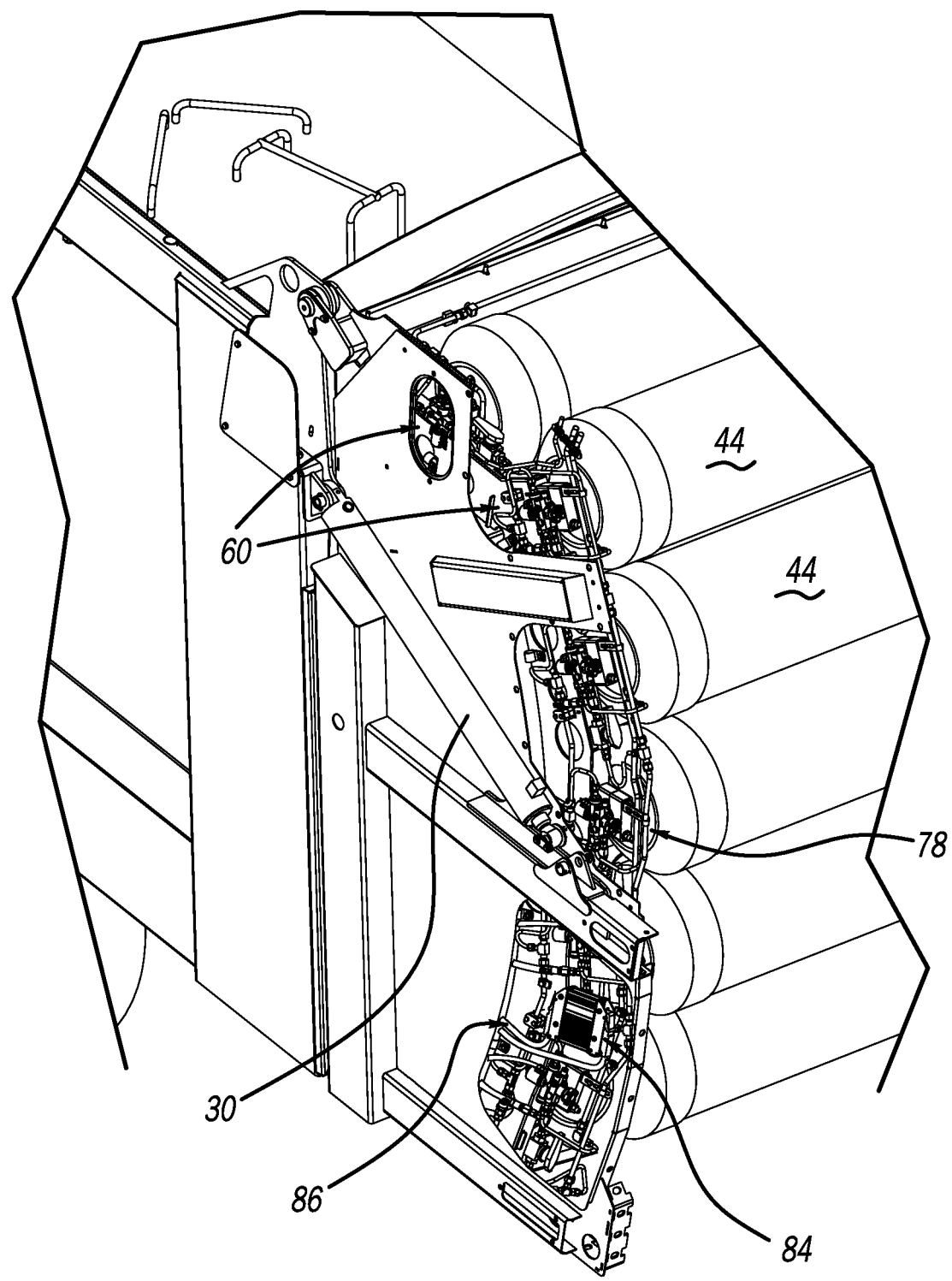
FIG. 6 is a perspective view of the tanks with the cover removed.
Figure 7:
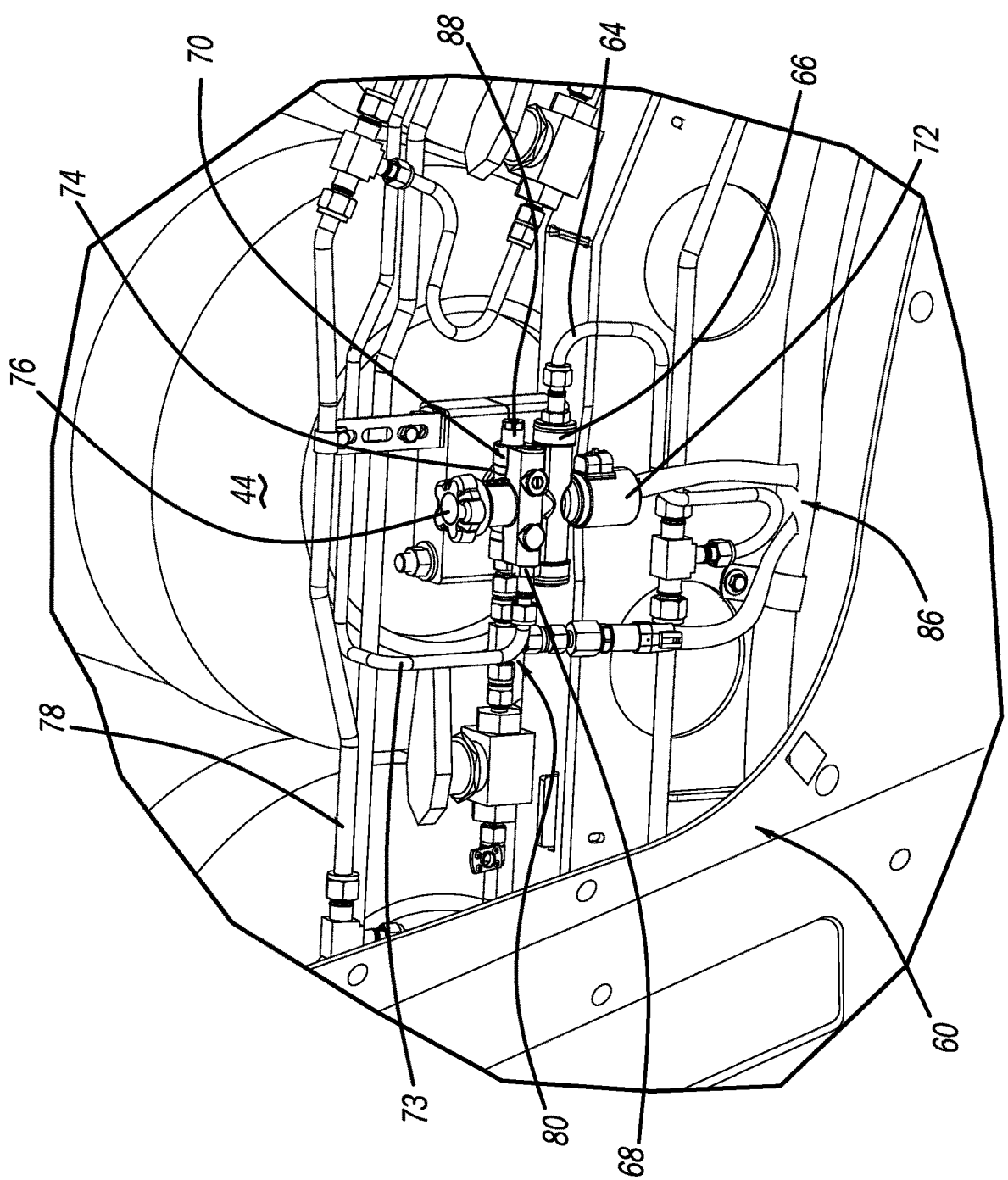
FIG. 7 is a perspective enlarged view of a valve on the tank.
Figure 8:
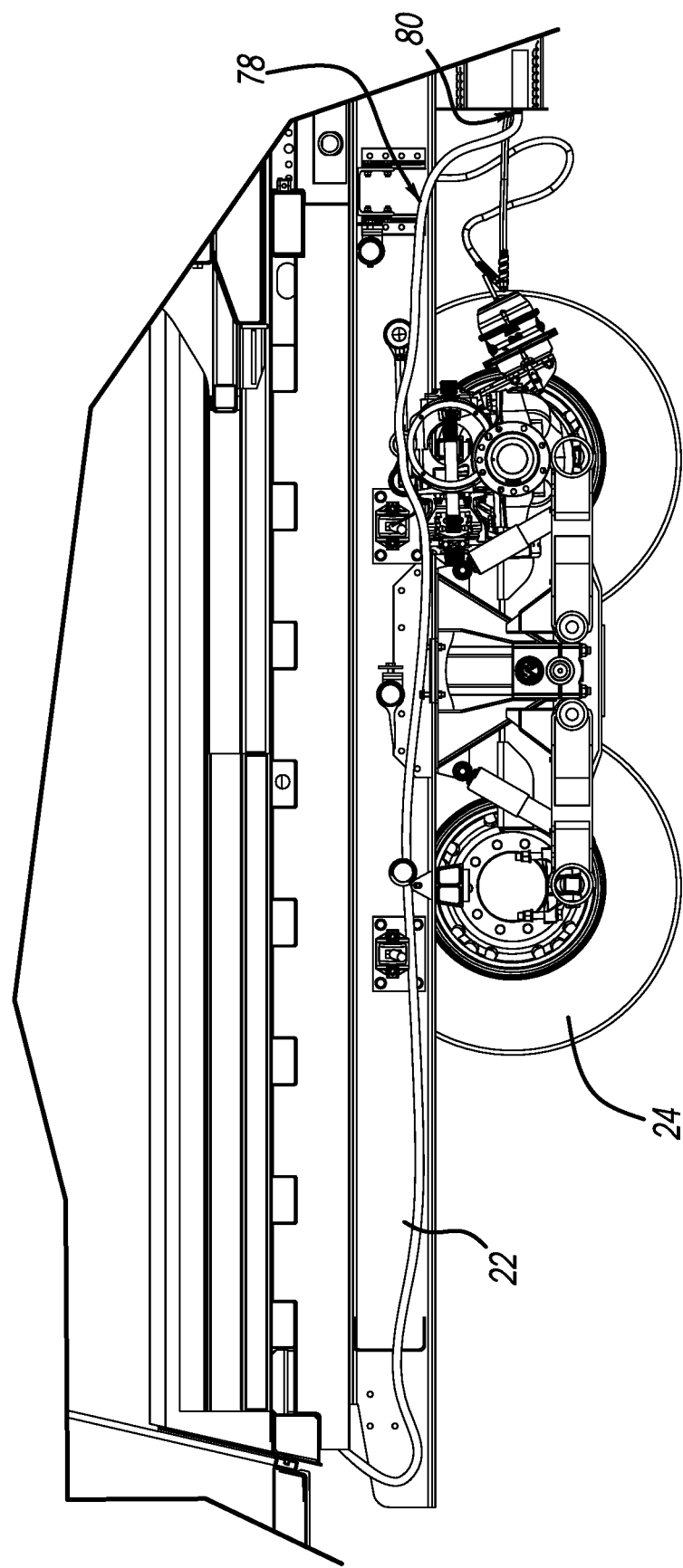
FIG. 8 is an elevation view of the vehicle.

The tailgate 20 is secured to the container 16 by hinges 26. The hinges 26 are connected around pivot pins 28 so that the tailgate 20 can rotate with respect to the refuse container 16. In order to rotate, a pair of lift cylinders 30 is on each side of the tailgate 20. The lift cylinders 30 are coupled with the tailgate so that, for opening of the container 16, the cylinders 30 are actuated which, in turn, pivots the tailgate 20 about the pivots pins 28 via the hinges 26 as seen in FIG. 2.

The tailgate 20 includes a cover 40, framework 42 and a plurality of CNG tanks 44. The cover 40 includes a front portion 46, a top portion 48, side portions 50, 52, a back portion 54, and bottom portion 56. The cover portions 46-56 surround the framework 42 and tanks 44 to prevent access to the tanks 44. The disclosure of U.S. Ser. No. 14/107,789 filed Dec. 16, 2013 entitled "Tailgate With Structurally Integrated CNG System" is incorporated herein.

Each tank includes a control valve 60 and a relief valve 62. The relief valves 62 are attached to vent tubes 64 that enable the compressed natural gas (CNG) to escape from the tanks. This may occur when the tanks encounter an increased pressure above a limit pressure. Also, this may occur when the tanks reach a designated temperature. Alternatively, the relief valves 62 may do both. The control valves 60 also include a relief valve portion 66 coupled with a vent tube 64.

The control valve 60 includes a fuel supply and return portion 68, a sensor retaining portion 70, and a solenoid valve 72. The control valve 60 also includes an attachment portion 74 that enables the control valve 60 to threadedly secure with the tank 44. The control valve 60 includes a manual shut-off 76. The solenoid valve 72 is in a normally closed state. Thus, a signal must be received by the solenoid valve 72 in order to open it. When opened, the fuel in the tank 44 is enabled to pass into the fuel deliver portion 68 and, in turn, into the fuel line system 78. The fuel line system 78 can have many fittings and the like in the fuel line system 78. The fittings enable the fuel line to connect with the plurality of tanks and valves 60. A pressure sensor 80 is secured into the control valve 60. The sensor 80 as well as the solenoid valve 72 are electrically coupled with the processor 84 either via a harness 86 or wirelessly. The processor 84 sends signals, based on the ignition being on or off, to the solenoid valve 72 to activate and deactivate the solenoid valve which, in turn, opens and closes the solenoid valve 72. The processor 84 receives information from the sensor 80 and transmits the information to the display 90. Each tank 44 includes a control valve 60 as described. An additional sensor 80 is coupled, via the harness 86, with the fuel line system 78 generally at a position where the compressed natural gas enters the system. This sensor 80 provides information on the system.

In use, when the solenoid valve 72 is activated (ignition on), the valve gate is opened enabling gas to exit the tank 44 into the fuel line system 78. Upon deactivation (ignition off) of the solenoid valve 72, the control valve 60, which includes a check valve 88, enables the fuel in the system 78 to return into the tank 44. However, fuel cannot exit the tanks 44. Thus, fuel is enabled to return to the tank 44 to equalize pressure in the system 78 and in the tanks 44. The manual shut-off valve 76 can be closed to terminate flow in or out of the tank 44. When this occurs, this overrides the solenoid valve 72.

The pressure retaining portion 70 includes a passageway into the tank 44. The sensor 80, in the pressure retaining position 70, measures the pressure in the tank 44. The relief portion 66 has a passage that is blocked by a stop. Upon exceeding a predetermined temperature, the stop melts. Thus, the CNG gas is free to escape to atmosphere through the vent tubes. This enables the fuel within the tank 44 to escape through the relief valve portion 66 into the vent tube then to atmosphere.

Figure 9:
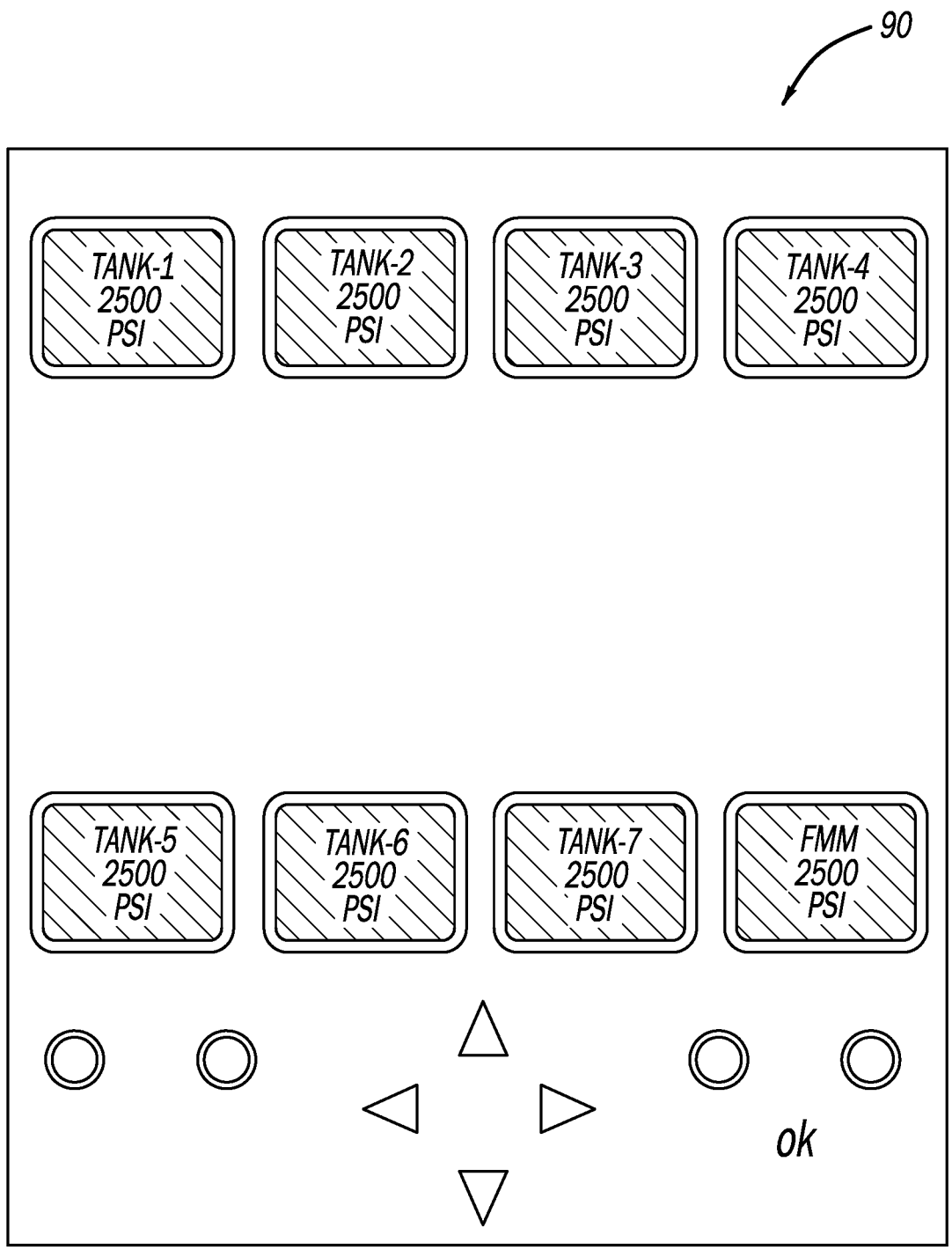
FIGS. 9-15 are plan views of the display.

When the ignition is turned on, a signal is sent from the processor 84 to open the solenoid valve 72. As the solenoid valve 72 is opened, fuel (CNG) passes from the tank 44 into the fuel line system 78 and, in turn, to the vehicle engine. All of the tanks 44 open as the ignition is turned on. Accordingly, an acceptable pressure should be present in the system and in each tank. Thus, the processor 84 sends a signal to the display 90 that displays the pressure in the tanks 44 indicating it is at an acceptable level. This generally is identified on the display 90 with a pressure reading and a background light illustrating that the tank is operable and functioning. Generally, the light is green as illustrated in FIG. 9. During optimal conditions, all tanks are open and an acceptable pressure is in each tank as well as in the system. The sensors 80 identify the pressure in active live time conditions. Thus, the processor 84 sends signals to the display 90 live, in real time, so that the user has the current status of the tanks 44 and the fuel system 78.

When the ignition is turned off, the solenoid valves 72 are deactivated and the valve gates move into a closed position. This terminates flow from the tanks 44 to the engine. However, the control valves 60 also allow the pressure to regulate and equalize in each tank due to the check valve in the control valve 60 that enables the gas, under pressure, in the system to return to the tanks.

Figure 10:
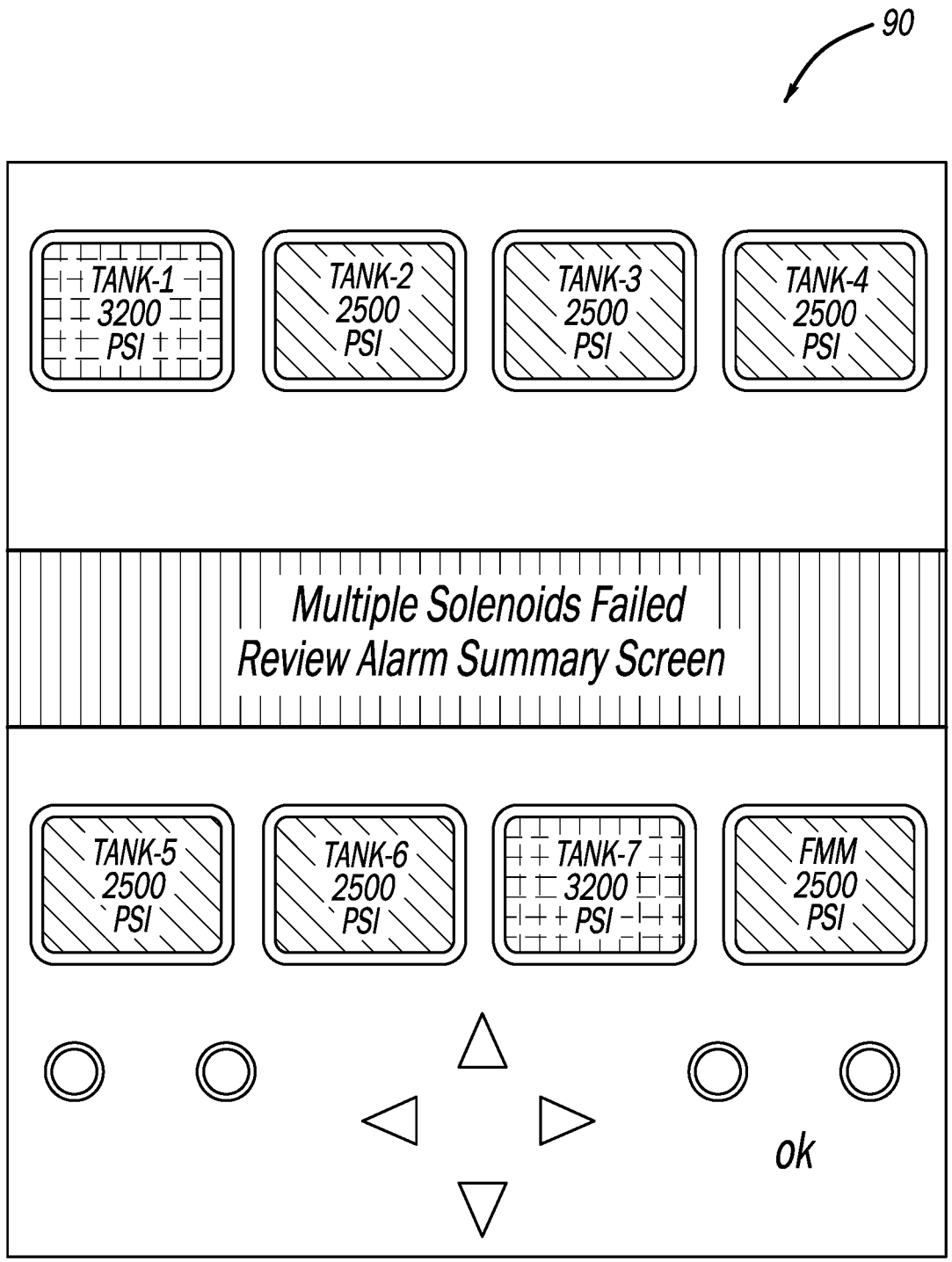
Figure 11:
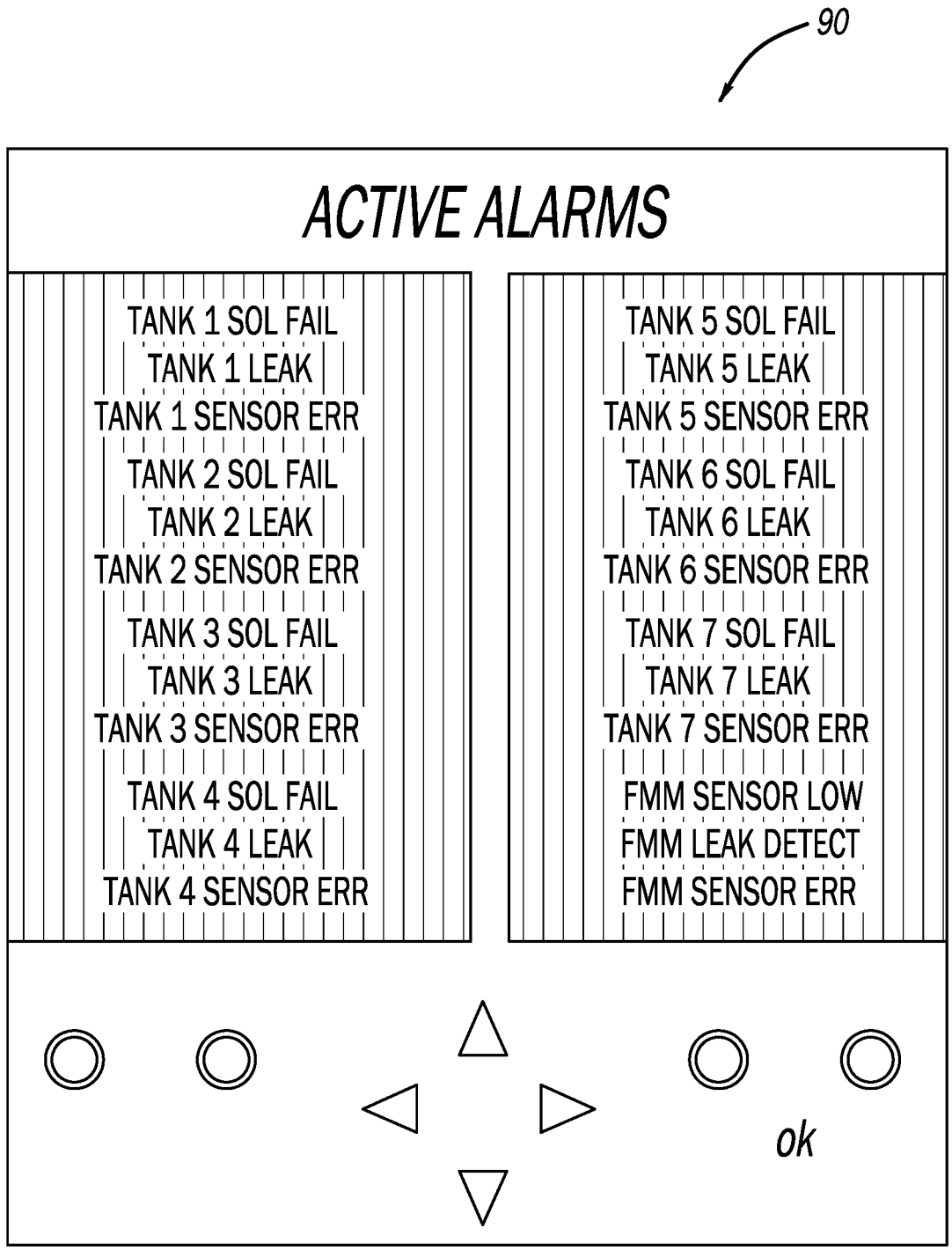

In the event the ignition is started and one or more of the solenoid valves 72 do not open, the processor 84 sends a signal to the display 90 to indicate one or more solenoid valve 72 failures. If a single solenoid valve failure occurs, it will be displayed on the display readout. However, if multiple solenoid valve 72 failure occurs, as illustrated in FIG. 10, the user must go to a more detailed screen (FIG. 11) to determine which solenoid valves 72 have failed. In the event that a solenoid valve 72 fails, along with having the visual alarm, an audio alarm in the vehicle cab will also be activated. The audio alarm will remain on until the user disables the failed solenoid valve 72 or the solenoid valve 72 again begins to function.

The solenoid valve(s) 72 failure is detected by the processor 84 that senses the pressure in the tanks 44 and compares it with the pressure in the system 78. A desired pressure differential, such as between 200 to 800 psi, can be utilized to determine that one or more of the solenoid valves 72 has malfunctioned. The display 90 will display a pressure of the tanks 44 that is at a pressure higher or lower, by the pressure differential, than the pressure of the fuel system 78. Thus, a particular tank will be identified by the processor 84, via the pressure differential between the tank pressure and the fuel system pressure, that the solenoid valve 72 has failed.

Figure 12:
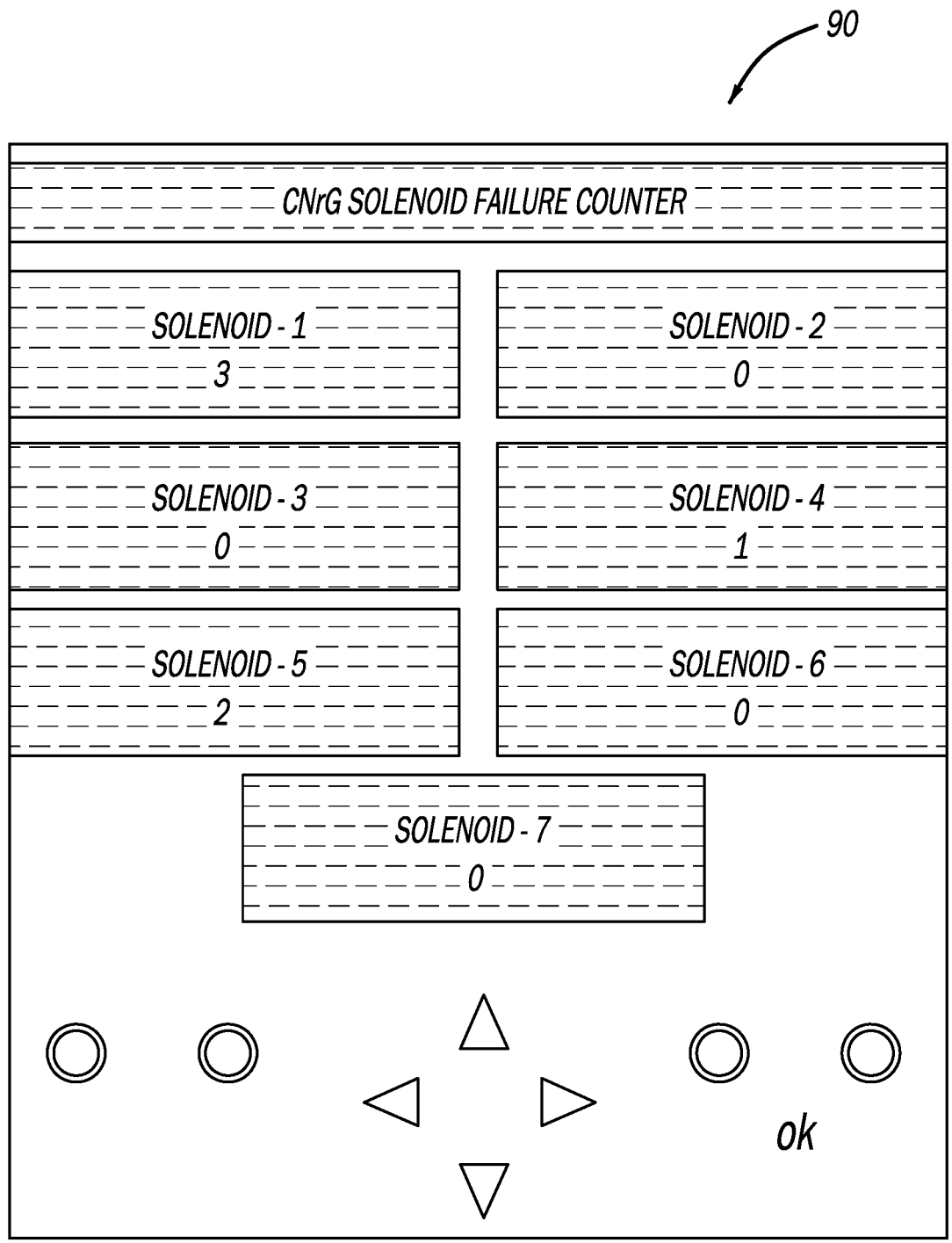

Additionally, the processor 84 monitors the number of times that a particular solenoid valve 72 has failed. The solenoid valve 72 failure counter screen can be obtained by manipulating the display 90 to provide the proper screen as illustrated in FIG. 12.

Figure 13:
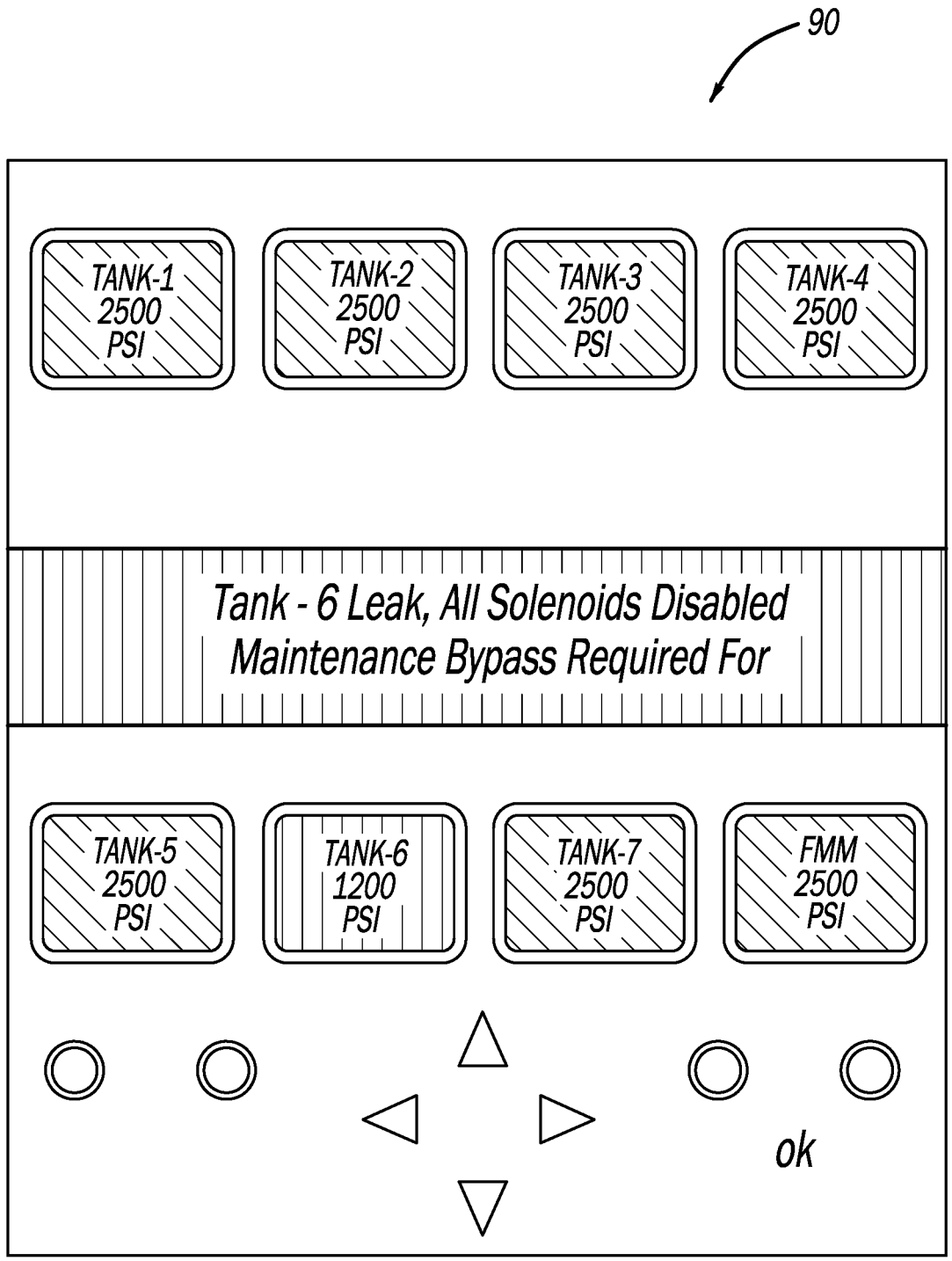

During running of the vehicle, the user can determine if an abnormal dropping of the pressure occurs in the tank or tanks that would indicate that a leak is present. Leak detection occurs when the ignition is off. The leak detection pressure differential is usually greater than the solenoid valve 72 failure pressure differential. Generally, the leak detection differential is between 400 and 1000 psi. While the vehicle ignition is off, a differential will occur between the tanks 44 and the system 78. The processor 84 will determine, via the sensors 80, the pressure differential between the tanks 44 and the fuel system 78. If a tank 44 is leaking and the pressure differential is reached, a warning alarm, in the form of an audio alarm will occur when the ignition is off. When the ignition is turned on, a visual alarm will go off like that in FIG. 13. Here, the visual indicator is in red.

If a leak occurs, the processor 84 will send a signal to disable all of the solenoid valves 72. Thus, the solenoid valves 72 shut down so that fuel (CNG) cannot exit into the fuel system 78. Additionally, the audio signal alarm will occur when the ignition is on or off. Once the processor 84 shuts down the solenoid valves 72, a maintenance or bypass code must be entered into the processor 84 to override the solenoid valves 72. Once the code is entered, the solenoid valves 72 are again activated. The solenoid valves 72 open which, in turn, enables fuel from the non-leaking tanks to enter into the fuel line system 78.

Figure 14:
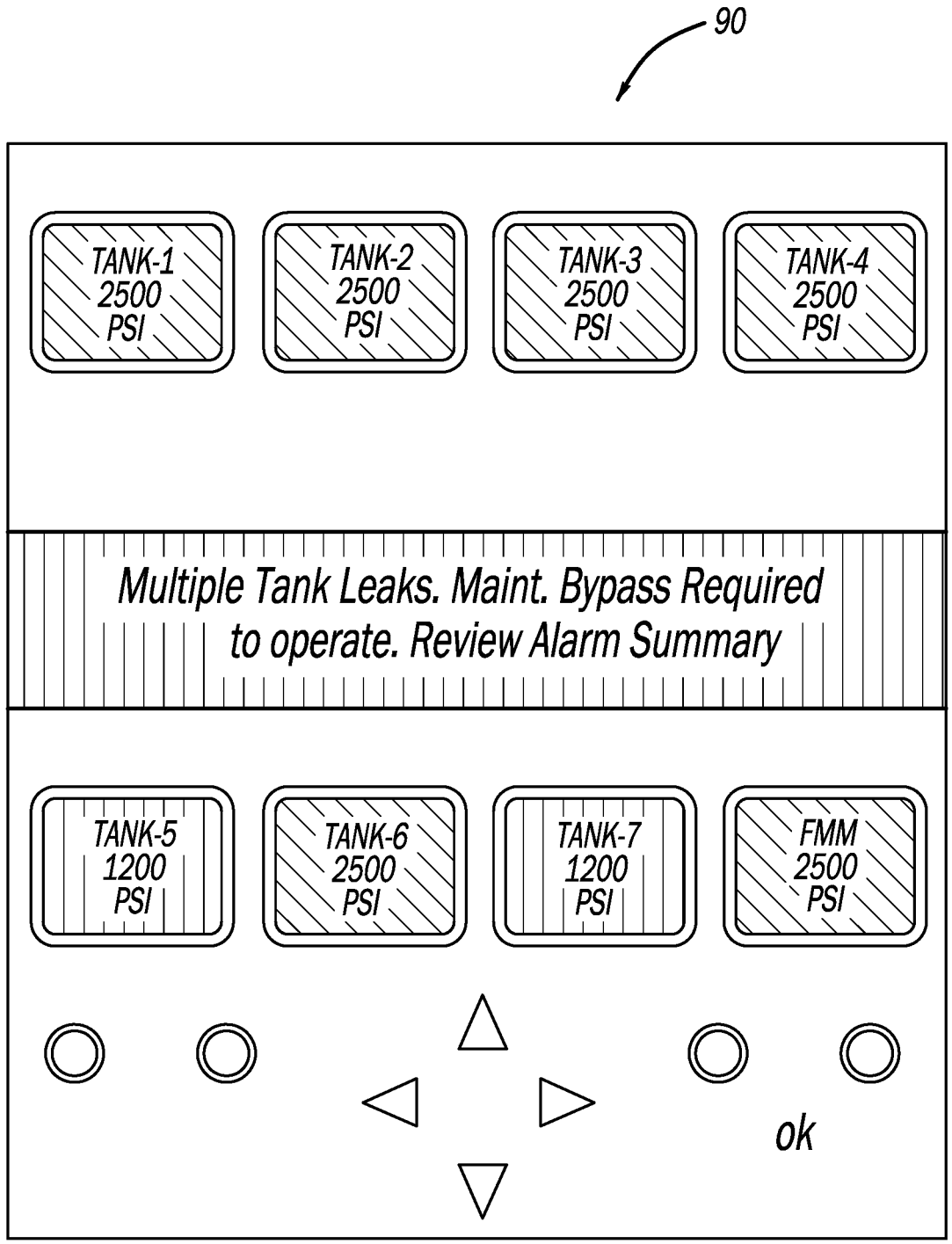

The leaking tank 44 should be manually shut down prior to entering the bypass code. Once the leaking tank 44 is manually shut down, via manual valve 76, fuel cannot enter or exit from the fuel line system 78 to that tank. Thus, the vehicle ignition will be able to be turned on and fuel (CNG) will flow from the remaining tanks into the engine. This enables the vehicle to be transported to a service facility. Again, the leak detection system is capable of detecting multiple leaks and the processor 84, via the display 90, displays the leaking tank(s) as illustrated in FIG. 14. Again, the same protocol would be conducted by the operator to shut down the multiple leaking tanks.

Figure 15:
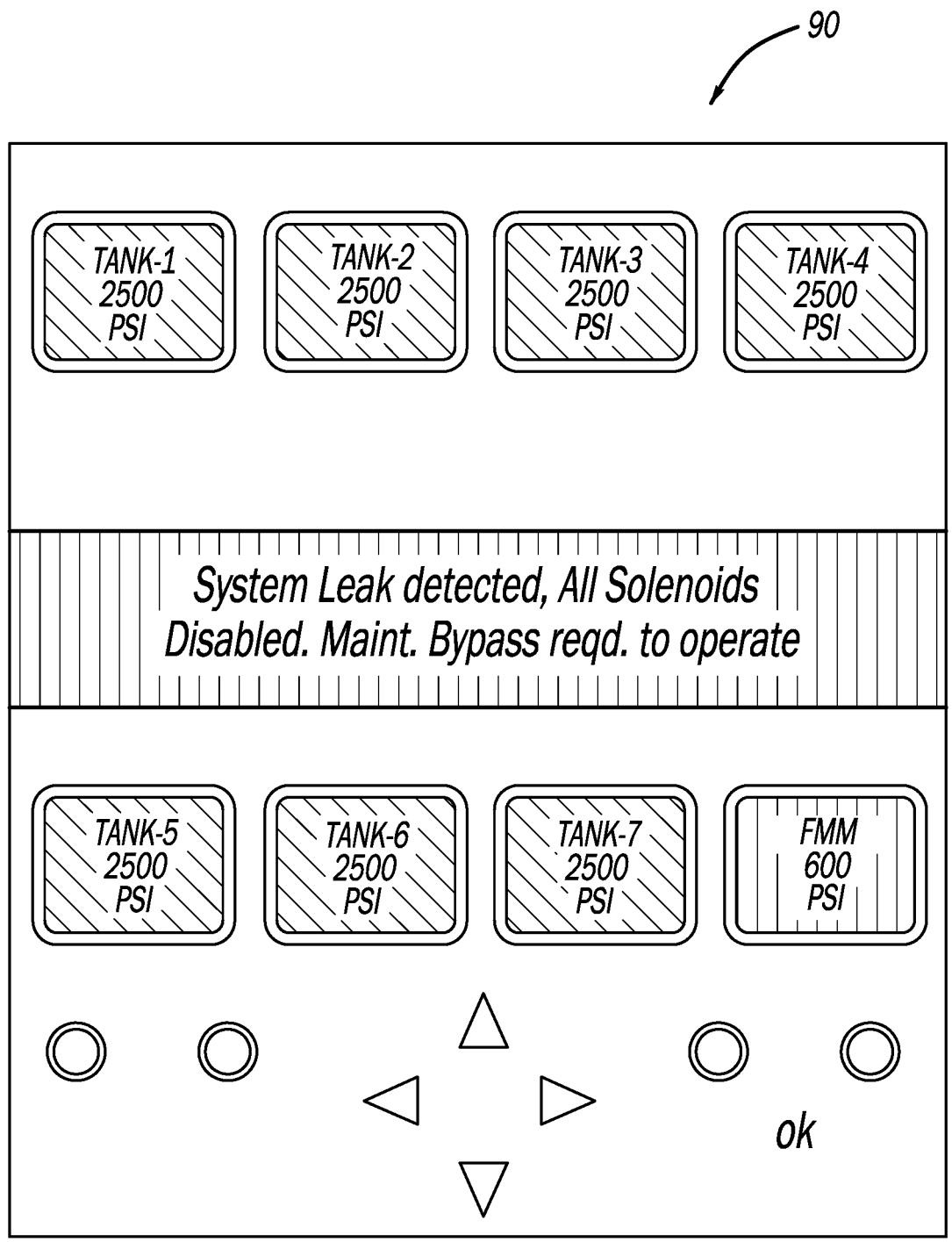

Should a fuel line system 78 leak occur, the processor 84 will again shut down the solenoid valves 72. This prohibits the solenoid valves 72 from opening when the ignition is turned on. The tank pressure sensors 80 identify the pressure in the tanks 44. The pressure sensors 80 in the fuel line system 78 will indicate the pressure in the fuel line system 78. The processor 84, comparing the two sensor signals, will determine if the pressure differential has been exceeded and a leakage has occurred. Thus, the tanks 44 will not be able to open to enable additional fuel into the fuel line system 78, and leak out. Again, the display 90 will illustrate a visual indicator, as illustrated in FIG. 15, lower pressure in the system 78, that indicates the system is leaking. Additionally, an audio alarm will be initiated.

In the system, leak detection and notification takes priority over the solenoid valve 72 failure indication. Also, if a sensor 80 is removed or fails, a message will be sent to the display 90 via the processor 84. The sensors 80 are on at all times. Thus, an audio alarm is activated in this situation even when the ignition is off. Also, the system is hooked up directly to the battery so that the failure and leak detection system is always activated and is monitoring the fuel line system 78 and tanks 44 even when the ignition is off. Thus, the leak detection and solenoid failure system provides for solenoid valve failure and leak detection monitoring at all times utilizing live, real time pressure readings in the tanks 44 and fuel system 78.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressed natural gas (CNG) system comprising:
   a CNG tank;
   a control valve comprising a solenoid valve;
   a fuel line system in fluid connection with the CNG tank;
   one or more sensors configured to detect a first pressure of the CNG tank and a second pressure of the fuel line system; and
   one or more processors communicatively coupled with the one or more sensors, the one or more processors configured to:
   i) detect a leak in the CNG tank in response to determining that the first pressure exceeds the second pressure by at least a first predetermined threshold,
   ii) detect a solenoid valve failure in response to determining that the second pressure exceeds the first pressure by at least a second predetermined threshold, and
   iii) transmit a signal indicative of a status of one or more of: the first pressure, the second pressure, the CNG tank, or the solenoid valve.

2. The CNG system of claim 1, wherein the one or more sensors comprise pressure sensors.

3. The CNG system of claim 1, wherein the signal indicative of the status comprises an alarm triggered by a detected leak or a detected solenoid valve failure.

4. The CNG system of claim 1, wherein the second predetermined threshold ranges from 200 to 800 pounds per square inch (psi).

5. The CNG system of claim 1, wherein the first predetermined threshold ranges from 400 to 1000 psi.

6. The CNG system of claim 1, wherein the one or more processors are configured to detect the leak while a refuse vehicle ignition is off.

7. The CNG system of claim 1, wherein the one or more processors are configured to detect the leak while a refuse vehicle ignition is on.

8. The CNG system of claim 1, wherein the one or more processors are configured to disable the solenoid valve if the leak is detected.

9. The CNG system of claim 1, wherein the CNG system is connected directly to a battery and is activated when an ignition is on or off.

10. The CNG system of claim 1, wherein the one or more sensors are configured to remain active when an ignition is on or off.

11. The CNG system of claim 1, wherein a display is communicatively coupled with the one or more processors, the display configured to receive the signal from the one or more processors.

12. The CNG system of claim 1, wherein the signal is indicative of a failure of a sensor of the one or more sensors.

13. A refuse vehicle comprising:
    a chassis with a drive train, wheels, a cab, a refuse container, and a compressed natural gas (CNG) tank on the refuse vehicle;
    a control valve comprising a solenoid valve;
    a fuel line system in fluid connection with the CNG tank;
    one or more sensors configured to detect a first pressure of the CNG tank and a second pressure of the fuel line system; and
    one or more processors communicatively coupled with the one or more sensors, the one or more processors configured to:
    i) detect a leak in the CNG tank in response to determining that the first pressure exceeds the second pressure by at least a first predetermined threshold,
    ii) detect a solenoid valve failure in response to determining that the second pressure exceeds the first pressure by at least a second predetermined threshold, and
    iii) transmit a signal indicative of a status of one or more of: the first pressure, the second pressure, the CNG tank, or the solenoid valve.

14. The refuse vehicle of claim 13, wherein the one or more sensors comprise pressure sensors.

15. The refuse vehicle of claim 13, wherein the signal indicative of the status comprises an alarm triggered by a detected leak or a solenoid valve failure.

16. The refuse vehicle of claim 13, wherein the second predetermined threshold ranges from 200 to 800 pounds psi.

17. The refuse vehicle of claim 13, wherein the first predetermined threshold ranges from 400 to 1000 psi.

18. The refuse vehicle of claim 13, wherein the one or more processors are configured to detect the leak while a refuse vehicle ignition is off.

19. The refuse vehicle of claim 13, wherein the one or more processors are configured to detect the leak while a refuse vehicle ignition is on.

20. The refuse vehicle of claim 13, further comprising a display communicatively coupled with the one or more processors, the display configured to receive the signal from the one or more processors.

21. The refuse vehicle of claim 20, wherein the display is configured to display a visual indicator corresponding to the signal.

22. The refuse vehicle of claim 20, wherein the display is configured to display the first pressure, the second pressure, or both the first and second pressures.

23. The refuse vehicle of claim 20, wherein the display is configured to display one or more visual indicators corresponding to the leak in the CNG tank or the solenoid valve failure.

24. The refuse vehicle of claim 20, wherein the display resides within the cab.

* * * * *